US008919639B2

(12) United States Patent
Leinicke

(10) Patent No.: US 8,919,639 B2
(45) Date of Patent: Dec. 30, 2014

(54) AUDIO/VIDEO INSTRUCTIONAL PACKAGING

(75) Inventor: Craig Leinicke, Ellisville, MO (US)

(73) Assignee: Illinois Tool Works Inc., Glenview, IL (US)

( * ) Notice: Subject to any disclaimer, the term of this patent is extended or adjusted under 35 U.S.C. 154(b) by 205 days.

(21) Appl. No.: 13/475,331

(22) Filed: May 18, 2012

(65) Prior Publication Data

US 2012/0292383 A1    Nov. 22, 2012

Related U.S. Application Data

(60) Provisional application No. 61/488,496, filed on May 20, 2011.

(51) Int. Cl.
*G06F 17/00* (2006.01)
*G09B 5/06* (2006.01)

(52) U.S. Cl.
CPC .......... *G09B 5/062* (2013.01); *B65D 2203/06* (2013.01)
USPC .......................................... 235/375; 235/381

(58) Field of Classification Search
USPC .......................... 235/375, 381, 383; 705/14.4
See application file for complete search history.

(56) References Cited

U.S. PATENT DOCUMENTS

| | | | |
|---|---|---|---|
| 7,055,737 B1 * | 6/2006 | Tobin et al. | 235/375 |
| 2012/0029984 A1 * | 2/2012 | Rakers et al. | 705/14.4 |
| 2012/0085828 A1 * | 4/2012 | Ziegler | 235/493 |
| 2013/0175335 A1 * | 7/2013 | Roberts | 235/375 |

* cited by examiner

*Primary Examiner* — Ahshik Kim
(74) *Attorney, Agent, or Firm* — Pauley Petersen & Erickson

(57) ABSTRACT

A product package including a two-dimensional scannable code that when scanned with a handheld device provides access to a website with instructions and a training video describing proper use and/or safe use of the product.

15 Claims, 4 Drawing Sheets

AUDIO/VIDEO INSTRUCTIONAL PACKAGING

CROSS-REFERENCE TO RELATED APPLICATION

This application claims the benefit of and priority to U.S. Provisional Application No. 61/488,496, filed 20 May 2011, the entirety of which application is incorporated herein by reference.

BACKGROUND OF THE INVENTION

1. Field of the Invention

This invention relates to a product package having a scannable code associated with a website displaying information about the product including a description of features of the product and a training video for proper use of the product.

2. Description of Prior Art

Companies seeking to describe their products and train end users of their products often rely on pamphlets and/or salespersons to accomplish these goals. However, each of these options has drawbacks.

As the products require greater and/or more detailed instructions, the pamphlets must accordingly increase in size. As the pamphlet increases in size, it becomes more difficult to include with the product packaging. Additionally, users of the product become less interested in reading and following large sets of written instruction.

On the other hand, reliance on salespersons and/or other employees to train customers can be expensive, including opportunity costs of training purchasers rather than selling to new customers. Further, reliance on salespersons is limited by each salesperson's aptitude to teach and knowledge of the product, often resulting in an inconsistent message/training to the end user.

Other methods of providing information and/or training regarding products to the end user include providing a website address, in association with the packaging, which provides instructions and/or training of the product. However, this method requires the user to retain the website address and later access the information.

Accordingly, there is a need to provide product information and training to users in a quick and accurate way without the shortcomings of the previously known approaches.

SUMMARY OF THE INVENTION

It is one object of this invention to provide a package for a product with a scannable code that connects a user to an informational website that includes a training video describing proper use the product. This invention allows the user of the product to scan the scannable code with a handheld device, for example a smart phone or a camera enabled tablet, to access the informational website. In a preferred embodiment, the scannable code is a Quick Response (QR) code.

This invention provides immediate access to training and educational videos via product packaging. Through the video, the product packaging becomes a visual training, education and learning device. Further, this invention provides a consistent product message through all sales channels. This invention also provides paperless training, instructions and education.

It is still another object of this invention to provide a method of applying the scannable code to a package made of corrugated cardboard. The method of applying the scannable code compensates for the soft and stretchable properties of corrugated cardboard by compensating for the stretch of the corrugated cardboard by spacing the features of the scannable code on a photopolymer printing press die.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

This invention provides a method of accessing detailed instructions and/or training for products which require specific instruction sets for proper and/or safe use.

Figure 1:
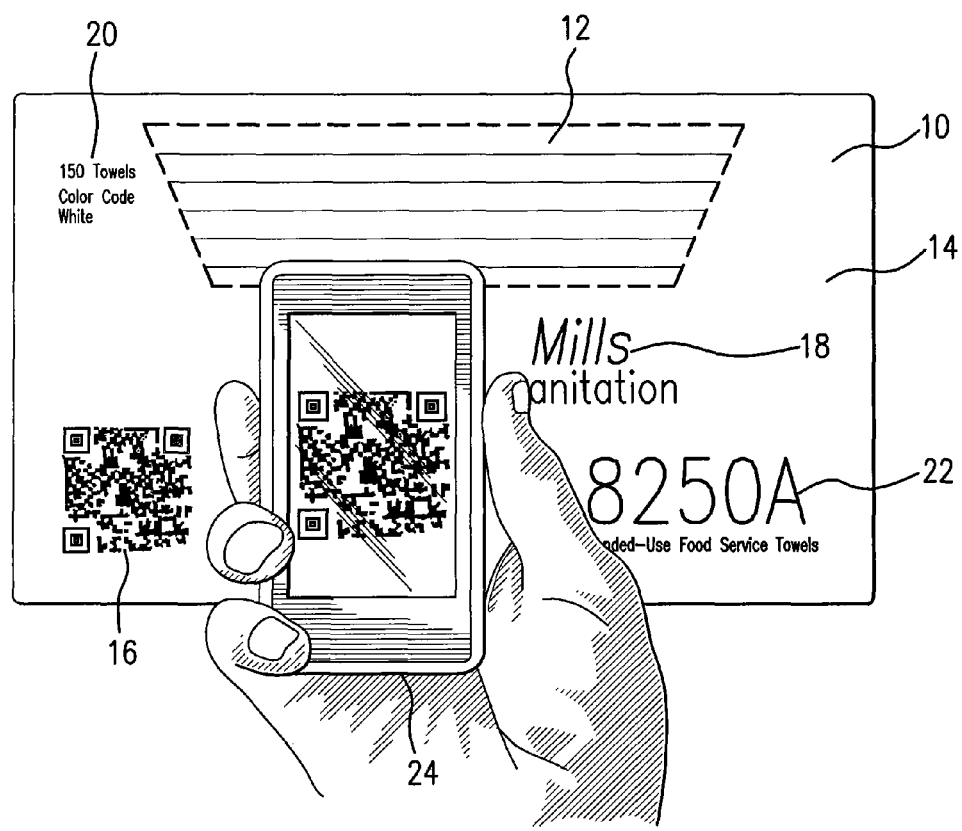
FIG. 1 shows a front view of a package including a scannable printed code according to one embodiment of this invention.

FIG. 1 shows a product package 10 for a product 12 according to one embodiment of this invention. Although the products 12 shown in FIG. 1 are sanitation towels, the product package 10 of this invention may be used in connection with any type of product requiring detailed instructions and/or training for proper use.

The product package 10 in this embodiment preferably comprises corrugated cardboard 14. However, the product package 10 may comprise any type of material including, for example, a paperboard or a plastic material.

In the embodiment shown in FIG. 1, the product package 10 includes a scannable code 16, a logo 18, a product description 20 and a product number 22 printed on the corrugated cardboard 14. The scannable code 16 on the product package 10 provides a method for accessing information about the product 12 on a website 26 (URL). The scannable code 16 shown in the embodiment of FIG. 1 is a Quick Response (QR) code. In other embodiments of this invention, the scannable code may comprise any type of code including but not limited to a data matrix code and a UPC code.

To access the website 26, a user scans the scannable code 16 with a hand held device 24. In a preferred embodiment the hand held device is a smart phone loaded with a general or customized code reader application. In alternative embodiments, the hand held device may comprise another device such as, but not limited to, a camera-enabled tablet computer or a scannable code reader.

Figure 2:
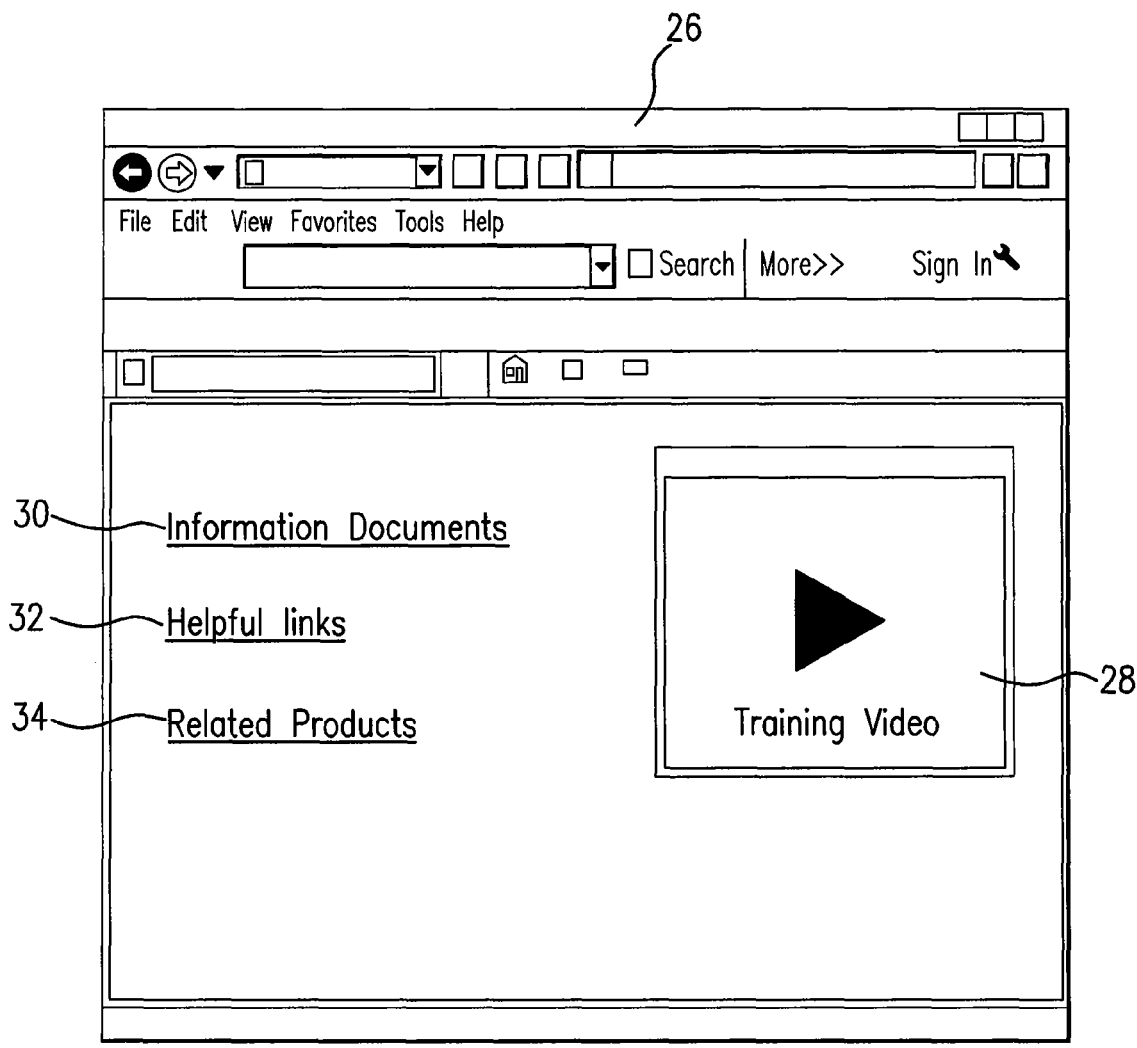
FIG. 2 shows a representative website for a product according to one embodiment of this invention.

Upon scanning the scannable code 16, the hand held device 24 connects to the website 26. FIG. 2 shows one preferred embodiment of such a website 26. The website 26 preferably provides detailed instructions regarding proper use of the product 12, specifically a video 28 showing proper and cost-effective use of the product. In a preferred embodiment, the video 28 is a streaming video. The website may also include additional information that may be helpful to the end user, including: an information document 30 with a description of proper use of the product; a link to helpful tips, coupons or discount offers 32; and a link to related products or websites 34.

The product package 10 of this invention provides a method for providing accurate and consistent training to an end user. For example, sanitation towels, as shown in FIG. 1, are produced and packaged in the product package 10 of this invention having the scannable code 16. The product packages 10 are sold to distributors/redistributors, who sell the sanitation towels to foodservice facilities. A foodservice manager uses a smartphone 24 or tablet computer to scan the scannable code 16 and access the training website. The foodservice manager then uses the training video 28 to train staff onsite and on-the-spot to provide an accurate and consistent method of use of the sanitation towels. As a result, the public receives improved foodservice sanitation.

Figure 3:
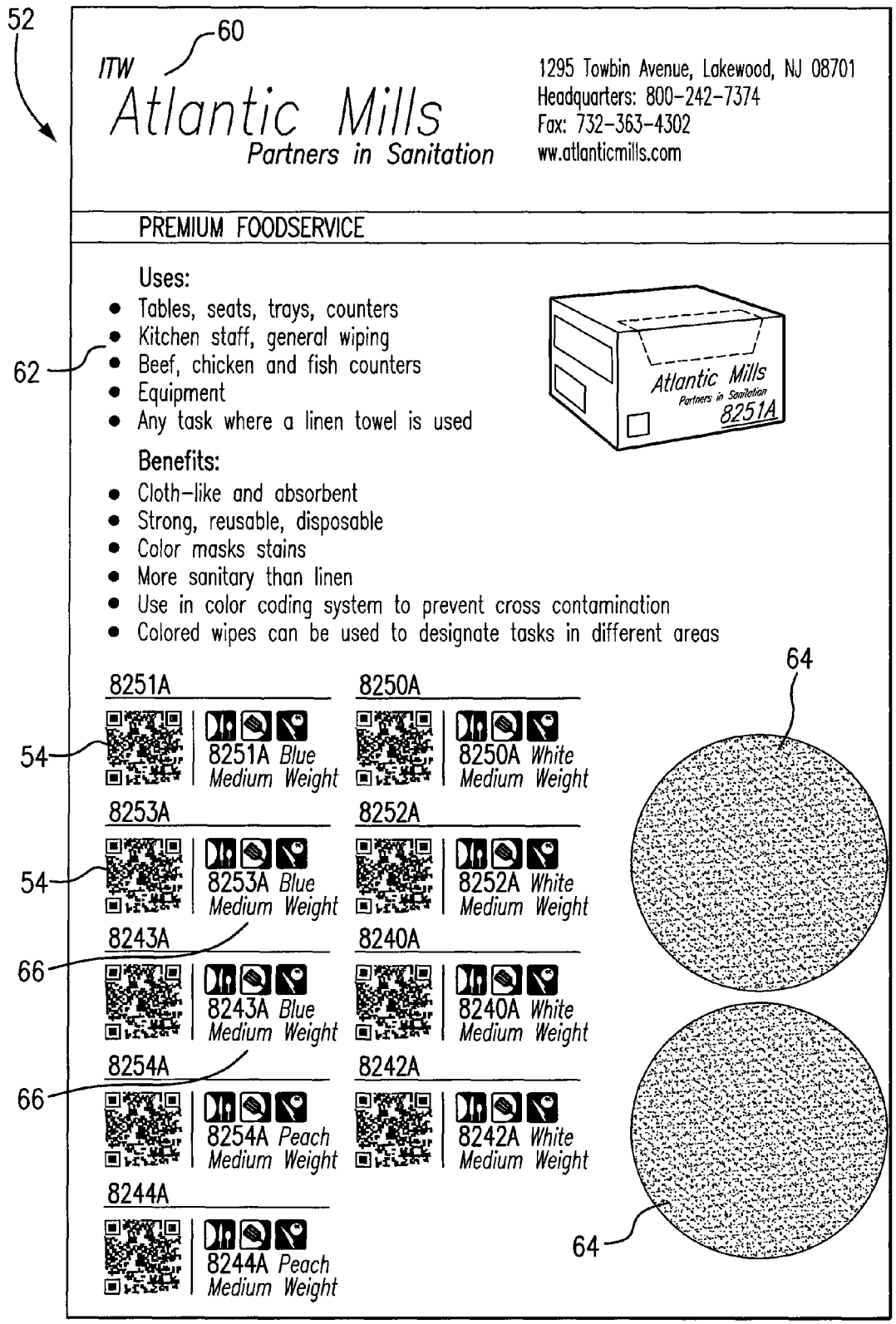
FIG. 3 shows a representative sales flyer for a plurality of products including a plurality of scannable printed codes according to one embodiment of this invention.
Figure 4:
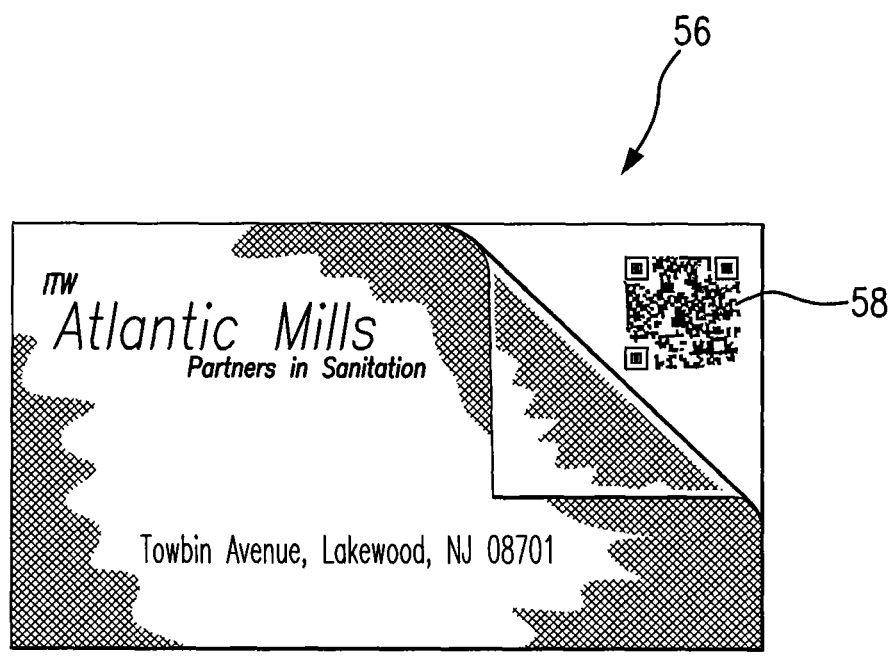
FIG. 4 shows a representative business card with a scannable printed code according to one embodiment of this invention.

In an embodiment of this invention, the product package 10 of this invention may further be a component of a coordinated marketing package 50. As shown in FIGS. 3 and 4, the coordinated marketing package further includes a sales flyer 52 with a plurality of flyer scannable codes 54 and a business card 56 with at least one scannable card code 58.

In the preferred embodiment of FIG. 3, the sales flyer 52 further includes a header 60, a product description 62, with a photograph, and a product sample 64, in addition to the plurality of flyer scannable codes 54. The flyer scannable codes 54 allow a salesperson to readily access product information regarding a variety of types of product to present various options for a customer's needs. In operation, the salesperson uses the handheld device 24, generally a smart phone, to access a website with information tailored specifically to a specific product 66. The tailored website includes a description of the proper and preferred use of the specific product 66 including a training video showing proper use of the product as well as the most cost effective ways of using the product. The tailored website may also include helpful tips, coupons or discount offers.

In an alternative embodiment, the sales flyer 52 is a page of a product brochure or folder containing information on a line of product offerings.

In another alternative embodiment, the sales flyer 52 further includes a salesperson scannable code, not shown, which provides access to a sales directed website containing information useful for salespersons including sales techniques/training, special offers, possible product bundling and a descriptions of upcoming products not yet available to the public. Preferably, the sales directed website is protected by a password or another means for limiting access.

FIG. 4 shows a business card 56 including scannable card code 58. The scannable card code 54 allows a customer with the business card 56 to access a company website and/or a product catalog by scanning the scannable card code 58 with their smartphone 24, camera-enabled tablet or other similar device. In a preferred embodiment, the business card 56 is distributed with a folder or a catalog containing the sales flyer 52 described above.

In an alternative embodiment, the product package 10 of this invention further includes additional scannable codes including a shipping scannable code and a sales scannable code. In a preferred embodiment, at least one of the shipping scannable code and the sales scannable code is positioned on a card which is detachably connected to the product package 10. The shipping scannable code provides a link to a website with information useful for shipping and handling the product including storage temperature, forklift handling and pallet stacking height. The sales scannable code provides a link to a sales directed website with information useful for salespersons including sales techniques, special offers, possible product bundling and a product catalog.

In addition, a method of printing the scannable code directly on a corrugated cardboard product package is described. In an embodiment of this invention, the scannable code 16, the logo 18, the product description 20 and the product number 22 are printed on the product package using a photopolymer printing press with a photopolymer die and flexo ink (a water based ink).

Previous methods of printing two-dimensional scannable codes directly on corrugated cardboard resulting in scannable code that could not be read by a hand held device. Scannable codes, particularly QR codes, are made up of small squares hooked together at different angles and are read as a two dimensional code. As with all printing, each of the small squares are made up of a series of small dots, the more dots the heavier the ink coverage. Previous methods of printing the scannable code on corrugated cardboard used too much ink and resulted in smudged and misshapen scannable codes which were not readable by code readers. Further, corrugated cardboard is a spongy and flexible surface that is deformed during the printing process. Previous methods of printing the scannable code directly on corrugated cardboard could not accurately adjust for the deformation, resulting in an unreadable scannable code. As a result, companies desiring to add scannable codes to their packaging, had to first print the scannable code to an adhesive label and then apply the label to a package causing increased costs to the company. The method of this invention overcomes the shortcomings of previously known methods.

Printing plates for corrugated cardboard generally include stretch allowances to compensate for the deformation of the cardboard as it passes through the flexography printing press. The stretch allowance of each flexography printing press is typically based on the cylinder size of the press. For example, a 38 inch cylinder would have a 4% cylinder stretch allowance in a press direction while a cross print direction would not include a stretch allowance. For most box printing if the allowance is 4% and the plates are made at +/−0.025% it would not be detectable to the naked eye.

While a UPC bar code, that includes code aligned in a single direction, can be accurately printed onto corrugated cardboard with the stretch allowances described above, QR codes cannot be accurately printed onto corrugated cardboard with this technique. The method of this invention includes an allowance made to the QR code on the flexography printing press die itself. The method of this invention uses bar width reduction (bwr) to separate the squares on the die in the machine direction. The pressure of the printing press squeezes a plate of the flexography printing press resulting in the printed squares being pressed back together when printing on the corrugated cardboard. The method of this invention requires determining the proper spacing of the squares on the printing die, i.e, an allowance percentage. If the percentage is too large, the squares of the QR code do not go back together during the printing step. If the percentage is too small, the squares of the QR code become distorted. In either case, the QR code will not scan. In a preferred embodiment of this invention, the correct bar width reduction (bwr) is approximately 0.033% in the machine direction where the QR size scans best at 75% or above (100% being 1⅝"×1⅝").

Additionally, the method of this invention requires determining a proper cylinder stretch allowance. If the cylinder stretch allowance is not accurately selected the QR may not scan properly. According to a preferred embodiment, a 4.125% cylinder stretch allowance provides good results that result in a scannable code.

The scannable code of this invention preferably includes dimensions greater than 1" by 1". In a preferred embodiment of this invention, the scannable code has dimensions greater than 1¼" by 1¼", which desirably provides a scan within 2 seconds.

In a preferred embodiment, the scannable code is printed with a first color ink and a second color ink. In one embodiment, the first color ink is blue and the second color ink is red. However, the scannable code may be printed with only the first color ink. Additionally, if the corrugated cardboard package is a dark color, for example brown, the scannable code preferably also comprises a dark color, for example a blue ink.

While in the foregoing specification this invention has been described in relation to certain preferred embodiments thereof, and many details have been set forth for purposes of illustration, it will be apparent to those skilled in the art that the apparatus is susceptible to additional embodiments and that certain of the details described herein can be varied considerably without departing from the basic principles of the invention.

The invention claimed is:

1. A coordinated marketing system for a product package comprising:
    a scannable code on the package;
    a video describing features and operation of the product, the video stored at a particular website address (URL) accessible by scanning the scannable code with a handheld device, wherein the video describes features and operation of the product prior to use of the product;
    a salesperson card including a second scannable code, wherein the second scannable code connects to a sales directed website not viewable by a consumer.

2. The coordinated marketing system of claim 1 wherein the scannable code is a QR code.

3. The coordinated marketing system of claim 1 comprising a corrugated carton.

4. The coordinated marketing system of claim 1 wherein the video comprises a training video.

5. A coordinated marketing system comprising:
    scanning a scannable code on a product package with a handheld device to access a website having a product description with a training video describing proper use of the product;
    scanning one of a plurality of flyer scannable codes on a flyer associated with the product package, wherein each of flyer scannable code accesses a separate website for a specific product variation;
    scanning a scannable card code on a business card associated with the package, wherein scanning the scannable card code accesses a third website with a product catalog.

6. The coordinated marketing system of claim 5 wherein the scannable code is a QR code.

7. The coordinated marketing system of claim 5 wherein each of the flyer scannable codes is a QR code.

8. The coordinated marketing system of claim 5 wherein the product package comprises a corrugated cardboard carton.

9. The coordinated marketing system of claim 5 wherein the flyer is a page in a catalog.

10. A package of a product comprising:
    a scannable product code printed on the package, the scannable product code associated with a website address with a description of the product and training to use the product;
    a scannable shipping code printed on a detachable shipping card on the package, the scannable shipping code associated with a second website address with a shipping and handling description;
    a scannable sales code printed on a detachable sales card on the package, the scannable sales code associated with a third website with a sales document including a training description and a description of related and cooperating products; and
    wherein each of the scannable product code, the scannable shipping code, and the scannable sales code is scannable with a handheld device having a code reader application.

11. The package of the product of claim 10, wherein at least one of the scannable product code, the scannable shipping code, and the scannable sales code is a QR code.

12. The package of the product of claim 11, wherein at least one of the scannable product code, the scannable shipping code, and the scannable sales code is printed directly on a corrugated carton.

13. The package of the product of claim 12, wherein at least one of the website, the second website and the third website includes a video related to the product.

14. The package of the product of claim 13, wherein the video comprises a training video.

15. The package of the product of claim 10, wherein the detachable sales card includes a plurality of scannable codes describing a plurality of related products.

* * * * *